S. C. MOORE.
BEE HIVE.
117914     Patented Aug 8 1871
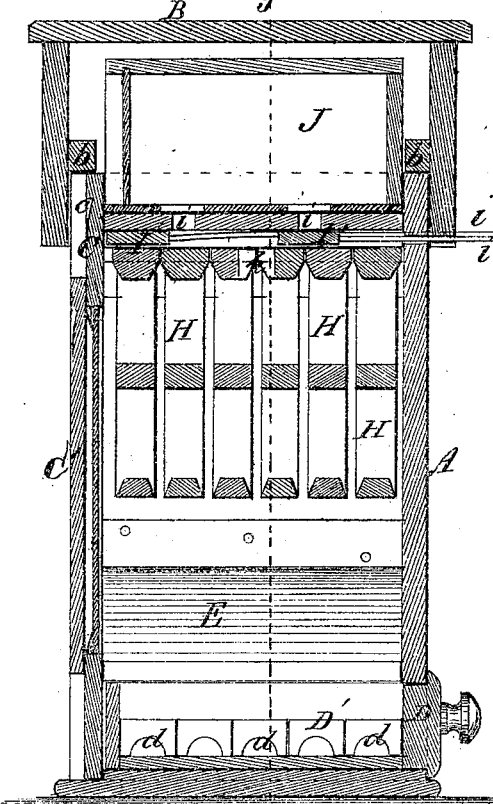
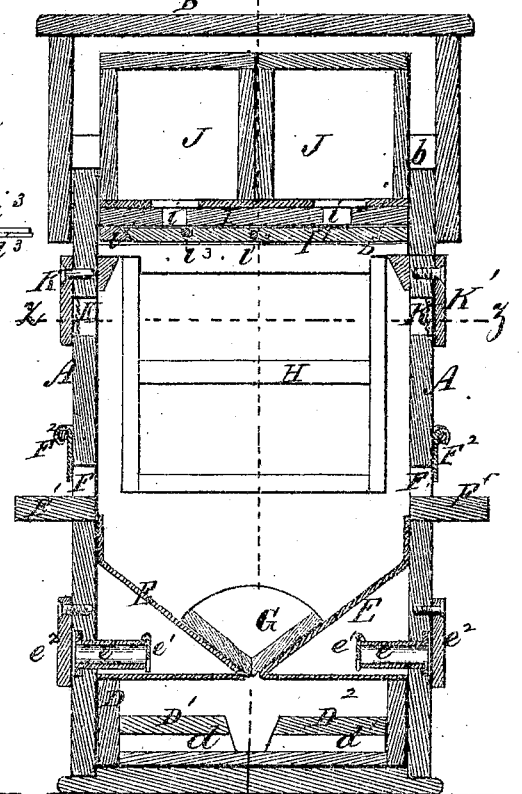
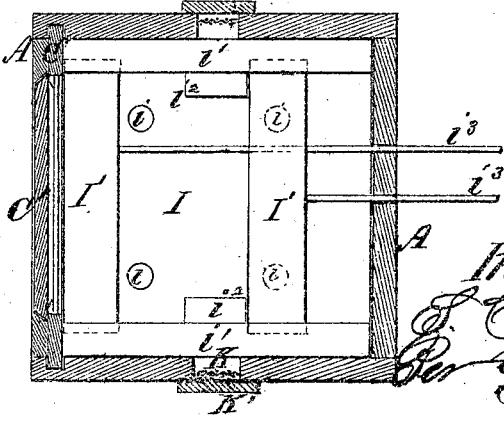

117,914

UNITED STATES PATENT OFFICE.

SAMUEL CHRISTOPHER MOORE, OF PATTONSBURG, MISSOURI.

IMPROVEMENT IN BEE-HIVES.

Specification forming part of Letters Patent No. 117,914, dated August 8, 1871.

*To all whom it may concern:*

Be it known that I, SAMUEL CHRISTOPHER MOORE, of Pattonsburg, in the county of Daviess and State of Missouri, have invented a new and useful Improvement in Bee-Hives; and I do hereby declare the following to be a full, clear, and exact description thereof, reference being had to the accompanying drawing forming a part of the same, and in which—

Figure 1 represents a vertical section of my improved bee-hive taken through the dotted line $x\ x$ of Fig. 2. Fig. 2 represents a vertical central section thereof through the dotted line $y\ y$ of Fig. 1. Fig. 3 is a transverse horizontal section of the same through the line $z\ z$ of Fig. 2, exhibiting the horizontal partition thereof, provided with slides for cutting off the passage of the bees from the comb-frames to the honey-boxes, in an inverted position, for the purpose of representing or exhibiting said slides or cut-offs; and Fig. 4 is a perspective view of a platform that is substituted in place of the feeding apparatus or trough when removed, for the purpose hereinafter stated.

Similar letters of reference in the several figures indicate corresponding parts.

This invention refers to an improved bee-hive; and it consists of the constituent parts thereof, when constructed, combined, and arranged substantially as more fully hereinafter described and claimed.

To enable those skilled or unskilled in the art to which my invention appertains to make and use the same, I will proceed to describe its construction and operation.

In the annexed drawing, A A refer to the house or casing of my bee-hive, and B to a cap or roof which fits thereon in such a manner that its sides are caused to extend a short distance below the upper end of said house, and is provided with blocks or strips $b\ b$, which rest upon the said house and allow the said cover or roof, in conjunction with its projecting sides, to be held in place upon its house A A, as shown in Figs. 1 and 2. C refers to a door or slide, notched at $c$ to receive one or more of the fingers of the hand for the purpose of removing the same when desired, and fitting within grooves cut vertically in the sides of the house A A. (See Fig. 3.) This door or slide, when removed, will permit of the removal of the comb-frames with the honey made by the bees, and the feeding-trough for the latter, and the replacing of the same. The door C is supplied, in an opening made therein, with glass or other transparent substance, for the purpose of permitting the person attending to the hive to ascertain as to the quantity of honey contained in the comb-frames, &c., without being put to the trouble of removing the said door, which it is desired to do only when one or more of the said frames is to be removed from the hive to obtain the honey therefrom, or to put food in the feeding-trough for the bees, or to remove the same. C′ is another slide or door, set in a frame fastened to the door C, and beveled upon its vertical edges, as seen in Fig. 3, for the purpose of adapting it to correspondingly-beveled grooves made in the vertical pieces of its frame, whereby it may be retained in place while being slid upward and downward in front of the transparent or glass portion of door C, which it covers when closed. D refers to a drawer or receptacle, which fits in the lower part of the house A A, and provided with a knob or handle for grasping the same when removed therefrom. This drawer is provided with two rows or series of blocks, $D^1\ D^2$, each of which blocks is constructed with a longitudinal recess or groove, $d\ d'$, and beveled at their inner ends, as shown in Fig. 2. The drawer D, with the blocks $D^1\ D^2$, constructed and arranged therein as described, constitutes the moth-trap. The inclined surfaces of the blocks above referred to prevent the moth, after having been precipitated into the drawer containing said blocks, from the inclined surfaces or tops of the miller-chambers, to be described hereinafter, from climbing the same; and the grooves in said blocks form chambers wherein the moth may web, and thus confine the moth within said drawer, which can be withdrawn from the house A A of the hive, as above stated, and relieved of its contents, whenever required. E E refer to the miller-chambers or traps, which are secured by suitable means to the inner sides of the house A A, as seen in Figs. 1 and 2, the tops or upper sides of which are inclined planes, so made for the purpose of precipitating the moth falling thereon after entering the hive, as hereinafter set forth, into the moth-trap or drawer above referred to. $e\ e$ are tubes or cylinders, fitting and suitably secured within openings or holes in the house A A, and supplied at their inner projecting ends with hinged lids or valves $e^1 e^1$, the lower extremities or edges of which are recessed so as to permit of the miller, when he enters the said tubes, seeing into the chambers or traps E E, for the purpose of causing him to enter the latter. The recesses or openings in the said hinged lids or valves are not for the purpose of allowing the miller to pass through them, but merely for the purpose above stated; hence are made smaller than the size of the miller so that, in order that the miller may enter the miller-chambers or traps E E, he must push the lids or valves $e^1 e^1$, containing said openings or recesses, open, upon the event of which he will be precipitated into the chambers E E, from which he has no means of escape, as the said lids or valves, by reason of their hinges and the position in which they are hung, directly after the entrance of the miller into the said chambers, close, their openings being too small for him to pass through at these points, consequently perfectly securing him within the said chambers or traps above alluded to. The tubes $e$ $e$, which, as already explained, furnish entrances for the miller to the chambers or traps E E, are furnished at their outer ends with lids or doors $e^2 e^2$, for the purpose of closing the same when desired. F F are the bee-entrances to the hive, which are supplied with the alighting-platforms $F^1 F^1$, upon which the bees alight previous to entering the openings or entrances F F. These entrances are also supplied with hinged doors or drops $F^2 F^2$, which are so hung in place as that their lower portions shall cover the said entrances sufficiently to prevent the drone from entering said entrances of the hive, and at the same time permit of the bees having access thereto or passing under said doors. Should the drone, which it is desired to expel from the hive at certain times, happen to be in the hive when the doors $F^2 F^2$ are closed, he can make his escape therefrom by slightly pressing against the said hinged or pivoted doors, as they will yield to such pressure and allow him to be freed from the hive; but he cannot enter the hive when the said doors are closed, as they immediately close upon his flight from the hive, and as the openings between their lower edges and the alighting-platforms $F^1 F^1$ are not sufficiently large to receive him, thus precluding the possibility of his having access thereto when such is required; but, should the contrary be desired, the said pivoted doors can be elevated or thrown up out of the way and both the drone and bees allowed to enter the hive. When the moths enter the bee-entrances it will be seen that they, instead of being allowed to follow the bees or to enter the comb-frames, will be precipitated upon the inclined roofs of the miller-chambers or traps, and from thence carried into the moth-trap aforesaid described. G refers to a trough in which food for the bees during the cold season is put, and which, when in use, is placed in the hive in such a manner as that its inclined sides shall rest upon portions of the inclined surfaces or roofs of the miller-chambers or traps E E, whereby it is retained in place without further fastenings. H are the comb-frames or racks upon which the bees deposit the honey, and which are supported, at the projecting ends of their upper horizontal bars, upon supports or rails secured to the inner sides of the house or casing A A. The upper or supporting-bars of the two middle comb-frames or racks are so recessed as that, when they are brought together, the said recesses will constitute an opening or hole, $h$, through which the bees may pass in going from the comb-frames or racks to the honey-boxes. I refers to a board placed within the upper part of the hive and supplied with openings or bee-passages $i$ $i$, between which and the comb-frames slide cut-offs or boards $I' I'$, having their ends beveled and fitting against beveled strips of wood $i^1 i^1$ fastened to the lower side of the board I. $i^2 i^2$ are blocks or boards secured to the board I between the cut-offs $I' I'$, and are for the purpose of preventing the said cut-offs from being slid past the openings $i$ $i$ while being pushed toward or over the same. $i^3 i^3$ are rods fastened to the cut-offs $I' I'$ and passing through apertures made in one side of the house A A, the object of which being for the purpose of sliding the said cut-offs over the openings $i$ $i$ or withdrawing them from over the said openings, as desired. By means of the cut-offs above described the bees are prevented from entering the honey-boxes when such is required. J J refer to the honey-boxes, the bottoms of which rest upon the board I and are supplied with apertures which communicate with the apertures $i$ $i$ of the said board, whereby the bees may enter the said boxes when the slides or cut-offs $I' I'$ are withdrawn from over the latter-named apertures. K K refer to ventilating-apertures made in the upper part of the house A A, and supplied with wire-gauze and lids $K' K'$ for closing the same when desired. L refers to a board which takes the place of the feeding-trough G when removed, the lower side of which being so constructed as to suit the inclined surfaces of the roofs of the miller-chambers E E upon which it rests when placed in the hive, its upper side being flat and resting in a horizontal position. This board is for the purpose of preventing the young bees from being precipitated into the moth-chamber should they accidentally fall from their resting-places.

Having thus described my invention, what I claim, and desire to secure by Letters Patent, is—

The receptacles or chambers E E and tubes $e$ $e$, with their recessed valves $e^1 e^1$, constructed, arranged, and operating substantially as herein shown and described.

In testimony that I claim the foregoing as my invention I have hereunto subscribed my name this 29th day of March, A. D. 1871, in presence of two subscribing witnesses.

SAMUEL CHRISTOPHER MOORE.

Witnesses:
 WILLIAM THOMAS BRYANT,
 JOHN BROWN.